(12) United States Patent
Liu et al.

(10) Patent No.: US 11,126,349 B2
(45) Date of Patent: Sep. 21, 2021

(54) DISPLAY DEVICE AND CONTROL METHOD THEREOF

(71) Applicant: BOE Technology Group Co., Ltd., Beijing (CN)

(72) Inventors: Cheng Liu, Beijing (CN); Guanchu Guo, Beijing (CN); Sijia Guo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/876,427

(22) Filed: May 18, 2020

(65) Prior Publication Data
US 2021/0089200 A1    Mar. 25, 2021

(30) Foreign Application Priority Data

Sep. 19, 2019  (CN) .......................... 201910888341.X (51) Int. Cl.
*G06F 3/0488* (2013.01)
*G06F 3/041* (2006.01)
*G06F 3/042* (2006.01)

(52) U.S. Cl.
CPC ........ *G06F 3/04883* (2013.01); *G06F 3/0412* (2013.01); *G06F 3/0421* (2013.01); *G06F 2203/04107* (2013.01)

(58) Field of Classification Search
CPC ........ G02B 27/0172; G02B 2027/0138; G02F 1/133509; G02F 1/133512; G02F 1/133528; G02F 1/133555; G02F 1/1336; G02F 1/133602; G06F 3/011; G06F 3/017; G06F 3/0304; G06F 3/0412; G06F 3/0421; G06F 3/04883; G06F 2203/04107; G06F 2203/04108; G06F 2203/04109; G06K 9/00389; G06K 9/2027; G06K 9/4642
See application file for complete search history.

(56) References Cited

U.S. PATENT DOCUMENTS

| | | | | |
|---|---|---|---|---|
| 2008/0317303 | A1* | 12/2008 | Konno | G06K 9/2027 382/124 |
| 2010/0150399 | A1* | 6/2010 | Svajda | G06K 9/2027 382/103 |
| 2013/0181896 | A1* | 7/2013 | Gruhlke | G06F 3/0428 345/156 |
| 2019/0371028 | A1* | 12/2019 | Harrises | G06T 11/60 |

* cited by examiner

*Primary Examiner* — Michael J Eunice
(74) *Attorney, Agent, or Firm* — Arent Fox LLP; Michael Fainberg (57) ABSTRACT

Disclosed are a display device and a control method. The display device includes: a transparent substrate; a transflective film disposed on a first side of the transparent substrate; a display screen disposed on a second side of the transparent substrate, the first side being opposite to the second side; and an infrared gesture recognition circuit disposed on the second side of the transparent substrate, where an orthographic projection of the infrared gesture recognition circuit on the transparent substrate and an orthographic projection of the display screen on the transparent substrate do not overlap each other; and the infrared gesture recognition circuit is configured to recognize a gesture at a side of the transflective film and control interface display of the display screen according to the determined operation gesture.

15 Claims, 8 Drawing Sheets

DISPLAY DEVICE AND CONTROL METHOD THEREOF

CROSS REFERENCE TO RELATED APPLICATION

This application claims priority to Chinese Patent Application No. 201910888341.X, filed with the Chinese Patent Office on Sep. 19, 2019. The entire disclosure of the above application is incorporated herein by reference.

FIELD

The present disclosure relates to the field of display technology, and particularly to a display device and a control method thereof.

BACKGROUND

A mirror display device refers to a device which is not only capable of realizing a display function but also can serve as a mirror. As such, the mirror display can meet various needs of a user.

SUMMARY

The present disclosure provides a display device and a control method thereof.

In a first aspect, an embodiment of the present disclosure provides a display device, including:
  a transparent substrate;
  a transflective film disposed on a first side of the transparent substrate;
  a display screen disposed on a second side of the transparent substrate, the first side being opposite to the second side; and
  an infrared gesture recognition circuit disposed on the second side of the transparent substrate, where an orthographic projection of the infrared gesture recognition circuit on the transparent substrate and an orthographic projection of the display screen on the transparent substrate do not overlap each other; and the infrared gesture recognition circuit is configured to recognize a gesture at a side of the transflective film and control interface display of the display screen according to the determined operation gesture.

In some embodiments, the display device further includes:
  a shielding film disposed on the second side of the transparent substrate;
    where the shielding film has a first opening area and a second opening area; an orthographic projection of the first opening area on the transparent substrate covers an orthographic projection of an active display area of the display screen on the transparent substrate; and an orthographic projection of the second opening area on the transparent substrate covers an orthographic projection of an effective photosensitive area of the infrared gesture recognition circuit on the transparent substrate.

In some embodiments, the infrared gesture recognition circuit includes: a circuit board, at least three infrared light emitting diodes (LEDs) and a photoelectric converter;
  where
  the circuit board is disposed on a side of the shielding film facing away from the transparent substrate;
  the at least three infrared LEDs and the photoelectric converter are connected to the circuit board, and light emitting surfaces of the at least three infrared LEDs and a photosensitive surface of photoelectric converter face the transparent substrate; and
  the second opening area has a plurality of first openings, and an orthographic projections of each of the plurality of first openings on the transparent substrate covers an orthographic projections of each of the at least three infrared LEDs and the photoelectric converter on the transparent substrate.

In some embodiments, the at least three infrared LEDs and the photoelectric converter are disposed on a side of the circuit board facing away from the transparent substrate; and
  the circuit board has a plurality of second openings, and an orthographic projections of each of the plurality of second openings on the transparent substrate covers an orthographic projections of each of the at least three infrared LEDs and the photoelectric converter on the transparent substrate.

In some embodiments, an orthographic projection of a first opening covering an orthographic projection of an infrared LED or a photoelectric converter covers an orthographic projection of a second opening covering an orthographic projection of said infrared LED or said photoelectric converter on the transparent substrate.

In some embodiments, where the at least three infrared LEDs and the photoelectric converter are disposed on a side of the circuit board facing the transparent substrate.

In some embodiments, the display device further including: a flat layer, wherein the flat layer is disposed on a side of the circuit board facing the transparent substrate;
  an orthographic projection of the flat layer on the transparent substrate and an orthographic projection of each of the at least three infrared LEDs and the photoelectric converter on the transparent substrate do not overlap each other.

In some embodiments, a distance between the flat layer and the transparent substrate is equal to a distance between the infrared LEDs and the transparent substrate.

In some embodiments, the transflective film has a plurality of third openings, and an orthographic projection of a third opening covering an orthographic projection of an infrared LED or a photoelectric converter covers an orthographic projection of a first opening covering an orthographic projection of said infrared LED or said photoelectric converter on the transparent substrate.

In some embodiments, the at least three infrared LEDs are in non-linear arrangement, and the photoelectric converter is disposed in an area enclosed by the at least three infrared LEDs.

In some embodiments, the infrared gesture recognition circuit includes three infrared LEDs; an area enclosed by the three infrared LEDs forms a right triangle; and the three infrared LEDs are respectively located at vertices of the right triangle, and the photoelectric converter is located at a midpoint of a hypotenuse of the right triangle.

In some embodiments, where the infrared gesture recognition circuit includes four infrared LEDs; an area enclosed by the four infrared LEDs forms a rectangle; and wherein the four infrared LEDs are respectively located at vertices of the rectangle, and the photoelectric converter is located at a center of the rectangle.

In some embodiments, where the infrared LEDs and the photoelectric converter operate within a central wavelength range of 850 nm-940 nm.

In some embodiments, the infrared gesture recognition circuit further includes a first chip;

where the first chip is connected to the photoelectric converter, and the first chip is configured to recognize the operation gesture according to an electrical signal output by the photoelectric converter.

In some embodiments, the display device further includes a second chip;

where the second chip is connected to the first chip, and the second chip is configured to control the interface display of the display screen according to the operation gesture.

In a second aspect, an embodiment of the present disclosure further provides a control method of the display device, where the display device includes a transparent substrate; a transflective film disposed on a first side of the transparent substrate; a display screen disposed on a second side of the transparent substrate, the first side being opposite to the second side; and an infrared gesture recognition circuit disposed on the second side of the transparent substrate; where an orthographic projection of the infrared gesture recognition circuit on the transparent substrate and an orthographic projection of the display screen on the transparent substrate do not overlap each other; and the infrared gesture recognition circuit is configured to recognize a gesture at a side of the transflective film and control interface display of the display screen according to the determined operation gesture; including:

wherein the control method includes:

recognizing, by the infrared gesture recognition circuit, a gesture at a side of the transflective film, and determining the corresponding operation gesture; and controlling interface display of the display screen according to the operation gesture.

In some embodiments, the infrared gesture recognition circuit includes at least three infrared LEDs and a photoelectric converter; and recognizing, by the infrared gesture recognition circuit, a gesture at a side of the transflective film, and determining the corresponding operation gesture includes:

converting, by the photoelectric converter, received optical signals into an electrical signal gesture recognition, where the optical signals are generated from the infrared LEDs and reflected by a hand at a side of the transflective film signal; and determining, by a first chip electrically connected to the photoelectric converter, the operation gesture corresponding to the electrical signal.

DETAILED DESCRIPTION OF THE EMBODIMENTS

In the related art, an outermost layer of a mirror display device is a mirror. A touch module is fitted inside the mirror, and is usually fitted to a light emitting surface of a display module. During use of the display device, a user needs to perform a touch operation directly on the mirror surface. Thus, fingerprints and stains are often left on the mirror surface, thereby affecting the mirror effect. In addition, when the user performs the touch operation on the mirror surface, a display screen is shielded, which affects the display effect.

In view of the aforementioned problems of the display device in the related art, embodiments of the present disclosure provide a display device and a control method thereof.

Reference herein to an "embodiment" means that a particular feature, structure, or characteristic described in conjunction with the embodiment may be included in at least one embodiment of the present disclosure. Appearance of the term "embodiment" at various places in the specification does not necessarily refer to the same embodiment, nor does it represent an independent or alternative embodiment mutually exclusive with other embodiments. Those skilled in the art understand explicitly and implicitly that the embodiments described herein may be combined with other embodiments.

It should be understood that the preferred embodiments described below are only used for describing and explaining the present disclosure, instead of limiting the present disclosure. Moreover, the embodiments in the present application and the features in the embodiments may be combined with each other without conflicts. In addition, the shapes and sizes of the components in the drawings do not reflect the true scale, and are merely intended to schematically illustrate the present disclosure.

To better understand the above technical solutions, the technical solutions of the present disclosure are described in detail below by using the drawings and specific embodiments. It should be understood that the embodiments of the present disclosure and specific features in the embodiments are detailed descriptions of the technical solutions of the present disclosure, instead of limitations of the technical solutions of the present disclosure. The embodiments of the present disclosure and the technical features in the embodiments may be combined with each other without conflict.

FIGS. 1-4 are schematic structural diagrams of a display device provided in an embodiment of the present disclosure. The display device includes:

a transparent substrate 10;

a transflective film 40 disposed on a first side of the transparent substrate 10;

a display screen 20 disposed on a second side of the transparent substrate 10, the first side being opposite to the second side; and an infrared gesture recognition circuit 30 disposed on the second side of the transparent substrate 10, where an orthographic projection of the infrared gesture recognition circuit 30 on the transparent substrate 10 and an orthographic projection of the display screen 20 on the transparent substrate do not overlap each other; and the infrared gesture recognition circuit 30 is configured to recognize a gesture at a side of the transflective film 40 and control the interface display of the display screen 20 according to the determined operation gesture.

In some embodiments, by using the transflective film, ambient light incident from a side of the transflective film facing away from the transparent substrate may be reflected, thereby achieving a mirror function; and light emitted by the display screen disposed on the second side of the transparent substrate may also be transmitted through the transflective film, thus the user at the first side of the transparent substrate can see an interface displayed on the display screen, thereby achieving a display function. Moreover, infrared light emitted by the infrared gesture recognition circuit may also be irradiated on the user's hand through the transflective film, and the infrared light reflected back by the user's hand is received by the infrared gesture recognition circuit through the transflective film, thereby recognizing the operation gesture to control the interface display of the display screen. Therefore, in the embodiments of the present disclosure, interface switching of the display screen may be controlled through the infrared gesture recognition circuit, without a touch module. This is beneficial to keeping the surface of the display device tidy, thereby improving the mirror function and display function of the display device.

Figure 2:
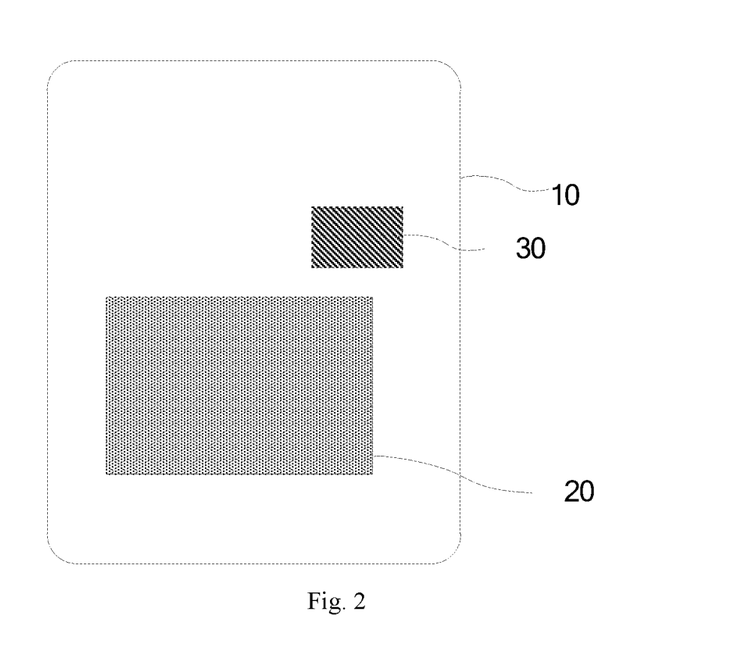
FIG. 2 is a front view of a second side of the display device provided in an embodiment of the present disclosure.

It should be noted that FIG. 2 is schematic by using an example that a display screen occupies only a part of the area of a display device; that is, only a part of the area of the display device is used for display. Of course, it is also possible that most of the area of the display device has a display function, and when it is not used as a mirror, it may be used for displaying time, posters and decorative images to play the role of publicity or decoration. It is selected according to actual needs during implementation and is not limited here.

The transparent substrate may be made of a transparent matrix material such as glass, which is conducive to the transmission of display light and infrared light.

Figure 3:
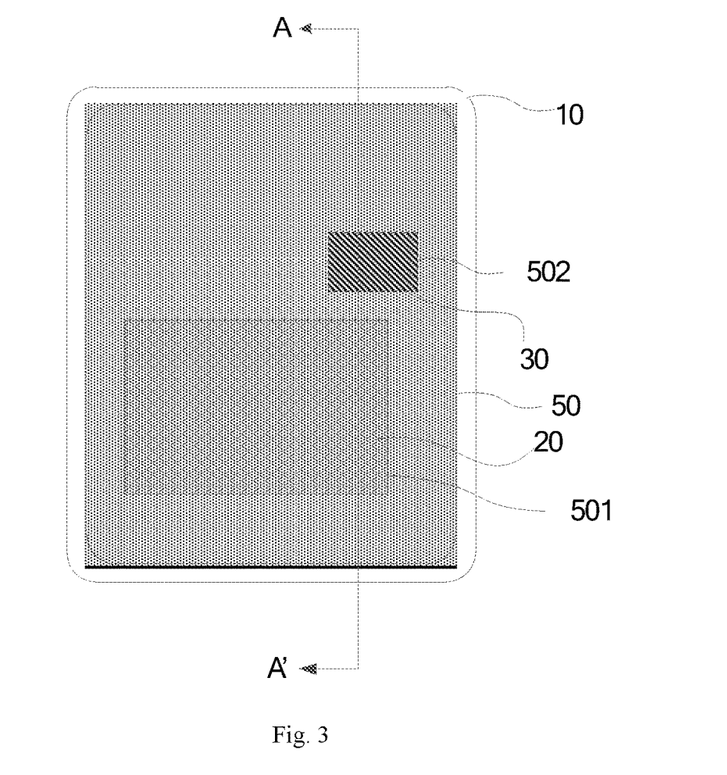
FIG. 3 is another front view of the second side of the display device provided in an embodiment of the present disclosure.
Figure 4:
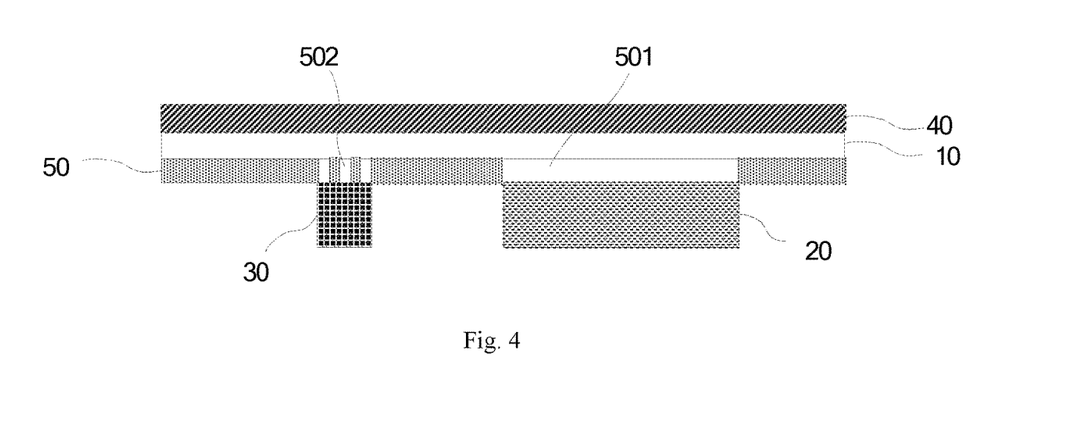
FIG. 4 is a cross-sectional view taken along the line AA' indicated in FIG. 3.

In some embodiments, as shown in FIGS. 3 and 4, the display device may further includes a shielding film 50. The shielding film 50 is disposed on the second side of the transparent substrate 10.

The shielding film 50 has a first opening area 501 and a second opening area 502. An orthographic projection of the first opening area 501 on the transparent substrate 10 covers an orthographic projection of an active display area of display screen 20 on the transparent substrate 10, and an orthographic projection of the second opening area 502 on the transparent substrate 10 covers an orthographic projection of an effective photosensitive area of infrared gesture recognition circuit 30 on the transparent substrate 10.

In an embodiment of the present disclosure, an opening area means that one or more openings are provided in the area.

In some embodiments, the shielding film may shield ambient light incident from the second side of the transparent substrate, so as to avoid the ambient light from affecting the reflection effect of the transflective film on the first side, thereby improving the mirror effect of the display device. In addition, the shielding film is also provided with a first opening area and a second opening area. Providing the first opening area allows the light emitted by the display screen to pass through the shielding film, the transparent substrate and the transflective film successively, thereby ensuring that the user can see the display interface normally. Providing the second opening area allows the infrared light emitted by the infrared gesture recognition circuit to pass through the shielding film, the transparent substrate and the transflective film successively, and allows the light reflected by the hand to pass through the transflective film, the transparent substrate and the shielding film successively and irradiate on the infrared gesture recognition circuit to recognize the operation gesture, so that the user may control switching of the display interface of the display screen through the operation gesture. With the above configuration, it ensures that the display device has both a display function and a gesture recognition function, which effectively avoids the influence of the touch operation on the display screen on the display effect of the display device and guarantees the display effect.

It should be noted that, as shown in FIG. 4, in a direction perpendicular to the transparent substrate, a thickness of the display screen and the infrared gesture recognition circuit is much greater than that of the shielding film. Furthermore, the second opening area is provided to allow the transmission of the infrared light. Therefore, as long as an effective area of infrared light emitting and receiving is provided, other parts of the infrared gesture recognition circuit may be shielded. Similarly, the first opening area is provided to avoid shielding the light of the display screen. Therefore, as long as an opening corresponding to the active display area of the display screen is provided, the shielding film may shield a bezel area of the display screen to some extent.

Figure 1:
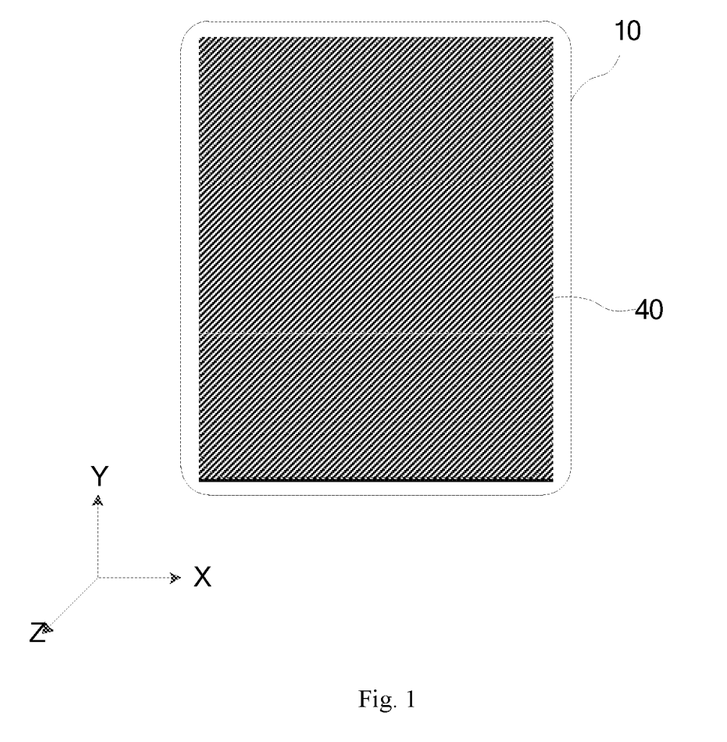
FIG. 1 is a front view of a first side of a display device provided in an embodiment of the present disclosure.

In an XYZ coordinate system shown in FIG. 1, an X-axis is parallel to one side of the display device, and a Y-axis is parallel to another side of the display device. FIG. 1 is a front view of the display device, and FIG. 3 is a top view of the shielding film 50 on the second side along a Z-axis in the display device of FIG. 1. FIG. 4 is a cross-sectional view taken along the line AA' indicated in FIG. 3.

In some embodiments, as shown in FIGS. 4-7, the infrared gesture recognition circuit 30 includes: a circuit board 301, at least three infrared LEDs (3021, 3022, 3023) and a photoelectric converter 303.

The circuit board 301 is disposed on a side of the shielding film 50 facing away from the transparent substrate 10.

The at least three infrared LEDs (3021, 3022, 3023) and the photoelectric converter 303 are connected to the circuit board 301, and light emitting surfaces of the at least three infrared LEDs (3021, 3022, 3023) and a photosensitive surface of photoelectric converter 303 face the transparent substrate 10.

The second opening area 502 has a plurality of first openings (5021, 5022, 5023, 5024). An orthographic projection of each of the plurality of first openings (5021, 5022, 5023, 5024) on the transparent substrate 10 covers an orthographic projection of each of the at least three infrared LEDs (3021 3022 and 3023) and the photoelectric converter 303 on the transparent substrate 10.

Figure 5:
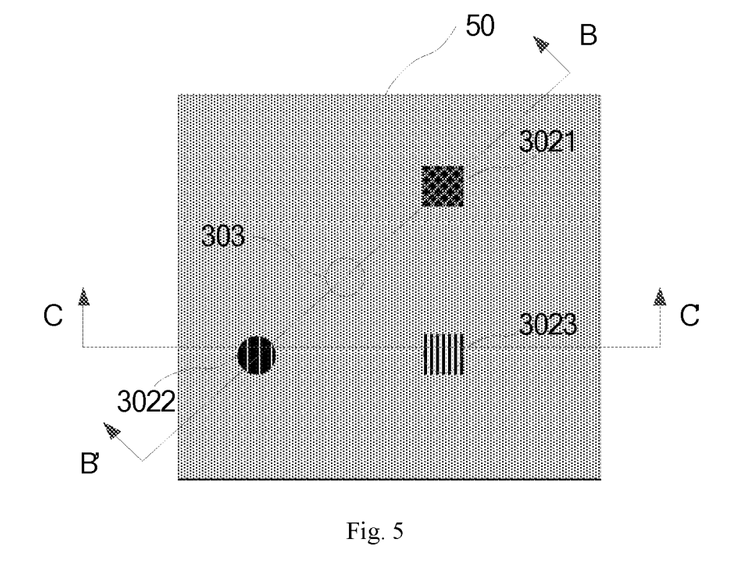
FIG. 5 is a schematic diagram illustrating the layout of three infrared LEDs and a photoelectric converter in the display device provided in an embodiment of the present disclosure.

In some embodiments, as shown in FIG. 5, the infrared gesture recognition circuit includes three infrared LEDs, which are infrared LED 3021, infrared LED 3022 and infrared LED 3023; and further includes a photoelectric converter 303. The infrared LED 3021 is arranged corresponding to the first opening 5021, the infrared LED 3022 is arranged corresponding to the first opening 5022, the infrared LED 3023 is arranged corresponding to the first opening 5023, and the photoelectric converter 303 is arranged corresponding to the first opening 5024. The infrared light emitted by the infrared LEDs (3021, 3022, 3023) may be irradiated on the user's hand through the first openings (5021, 5022, 5023), respectively, and the infrared light reflected back by the user's hand may be irradiated on the photoelectric converter 303 through the first opening 5024, so that the infrared gesture recognition circuit can effectively recognize the operation gesture to control the switching of the display interface of the display screen.

The infrared LEDs and the photoelectric converter may operate within a central wavelength range of 850 nm-940 nm. As the infrared light is invisible, the display effect of the display screen is not influenced. Furthermore, the infrared LEDs are successively lit up following a certain timing, so that the photoelectric converter may determine which infrared LED emits the infrared light received at specific time, thereby determining the operation gesture of the operator.

Figure 6:
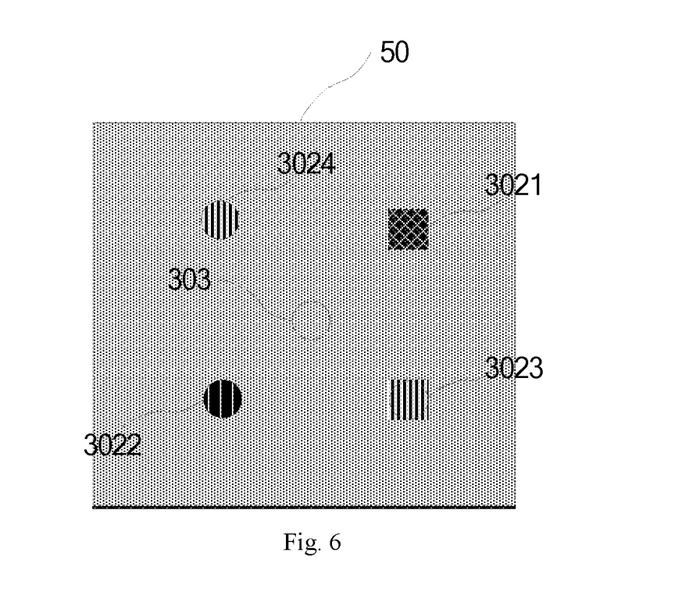
FIG. 6 is a schematic diagram illustrating the layout of four infrared LEDs and a photoelectric converter in the display device provided in an embodiment of the present disclosure.

In some embodiments, as shown in FIG. 6, the infrared gesture recognition circuit includes four infrared LEDs, which are infrared LED 3021, infrared LED 3022, infrared LED 3023 and infrared LED 3024; and further includes a photoelectric converter 303. An area enclosed by the four infrared LEDs (3021, 3022, 3023 and 3024) forms a rectangle; and the four infrared LEDs (3021, 3022, 3023 and 3024) are respectively located at vertices of the rectangle, and the photoelectric converter 303 is located at a center of the rectangle.

It should be noted that FIG. 5 is schematic diagram by using an example that the infrared gesture recognition circuit includes three infrared LEDs and one photoelectric converter, with an area enclosed by the three infrared LEDs being a right triangle; FIG. 6 is schematic diagram by using an example that the infrared gesture recognition circuit includes four infrared LEDs and one photoelectric converter, with an area enclosed by the four infrared LEDs being a rectangle. However, embodiments of the present disclosure are not limited thereto. The infrared gesture recognition circuit may also include more than three infrared LEDs and photoelectric converters. The shape enclosed thereby may also include a parallelogram, polygon or irregular shape, which may be selected according to actual needs, and is not limited here.

Figure 7:
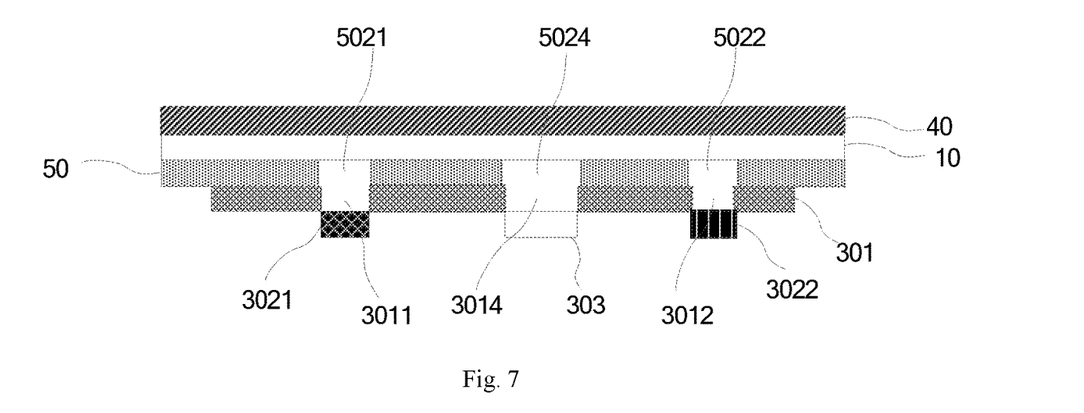
FIG. 7 is cross-sectional view taken along the line BB' indicated in FIG. 5.
Figure 8:
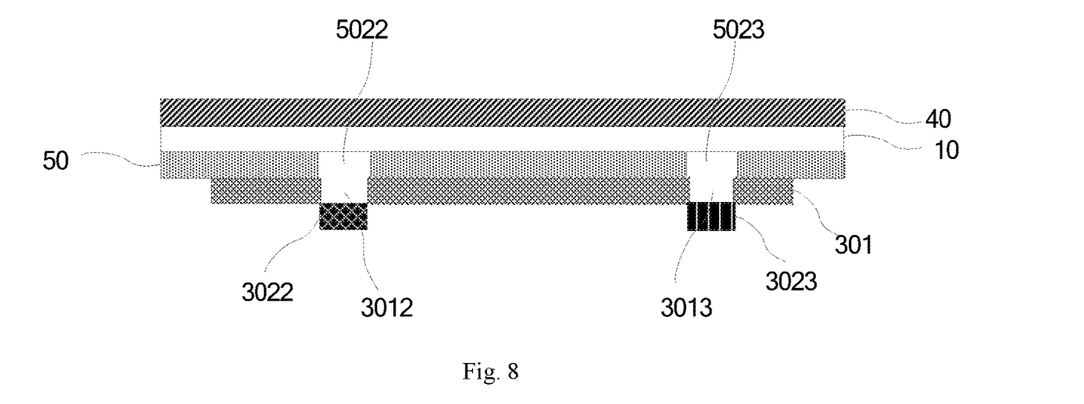
FIG. 8 is cross-sectional view taken along the line CC' indicated in FIG. 5.

In some embodiments, as shown in FIGS. 7 and 8, the at least three infrared LEDs (3021, 3022, 3023) and the photoelectric converter 303 are disposed on a side of the circuit board 301 facing away from the transparent substrate 10.

The circuit board 301 has a plurality of second openings (3011, 3012, 3013, and 3014). An orthographic projection of each of the plurality of second openings (3011, 3012, 3013, and 3014) on the transparent substrate 10 covers an orthographic projection of each of the at least three infrared LEDs (3021, 3022, 3023) and the photoelectric converter 303 on the transparent substrate 10.

In some embodiments, each of the infrared LEDs (3021, 3022, 3023) and the photoelectric converter 303 may be flip devices. That is, the at least three infrared LEDs (3021, 3022, 3023) and the photoelectric converter 303 may be disposed on the side of the circuit board 301 facing away from the transparent substrate 10. As the flatness of the surface on the side of the circuit board without the infrared LEDs and the photoelectric converters is much greater than that of the surface provided with the infrared LEDs and the photoelectric converters, and in this configuration, the flatter side of the circuit board may contact the shielding film, the bonding force between the circuit board and the shielding film may be increased, and the stability between components of the display device may be improved.

Figure 11:
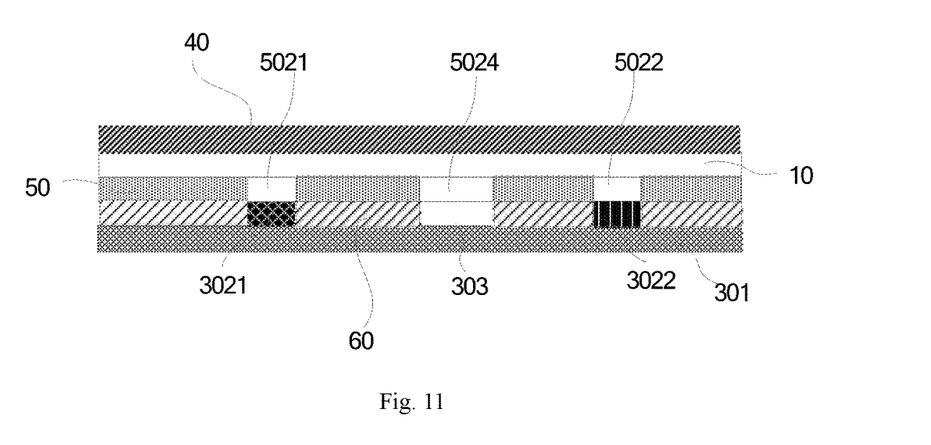
FIG. 11 is another cross-sectional view taken along the line BB' indicated in FIG. 5.

In some embodiments, as shown in FIG. 11, the at least three infrared LEDs (3021 and 3022) and the photoelectric converter 303 are disposed on a side of the circuit board 301 facing the transparent substrate 10. In some embodiments, the display device further includes a flat layer 60, where the flat layer 60 disposed on a side of the circuit board 301 facing the transparent substrate 10; an orthographic projection of the flat layer 60 on the transparent substrate 10 and an orthographic projection of at least three infrared LEDs (3021 and 3022) and the photoelectric converter 303 on the transparent substrate 10 do not overlap each other. Through flattening layer, the surfaces of the infrared LEDs and the photoelectric conversion tube can be flattened, which is convenient for the subsequent production of the film layer. In some embodiments, a distance between the flat layer and the transparent substrate is equal to a distance between the infrared LEDs and the transparent substrate.

It should be noted that the relative positional relationships between the infrared LEDs and the photoelectric converter and the circuit board may be selected according to actual needs, and are not limited here.

In some embodiments, the at least three infrared LEDs (3021, 3022, 3023) and the photoelectric converter 303 are disposed on the side of the circuit board 301 facing away from the transparent substrate 10. The circuit board 301 is provided with a plurality of second openings (3011, 3012, 3013, and 3014). The infrared LED 3021 is arranged corresponding to the second opening 3011, the infrared LED 3022 is arranged corresponding to the second opening 3012, the infrared LED 3023 is arranged corresponding to the second opening 3013, and the photoelectric converter 303 is arranged corresponding to the second opening 3014. The second openings are provided to avoid shielding of the infrared light by the circuit board.

In some embodiments, as shown in FIGS. 7 and 8, an orthographic projection of a first opening covering an orthographic projection of an infrared LED (3021, 3022, 3023) or a photoelectric converter 303 covers an orthographic projection of a second opening covering an orthographic projection of said infrared LED or said photoelectric converter on the transparent substrate. For example, for the infrared LED 3021, an orthographic projection of the correspondingly arranged first opening 5021 on the transparent substrate 10 covers an orthographic projection of the correspondingly arranged second opening 3011 on the transparent substrate 10.

In some embodiments, the orthographic projection of a first opening on the transparent substrate covering the orthographic projection of a second opening on the transparent substrate means that the area of the orthographic projection of the first opening on the transparent substrate is greater than or equal to the area of the orthographic projection of the second opening on the transparent substrate, so as to effectively grantee the transmission of the infrared light, and avoid shielding of infrared light by the shielding film.

Figure 9:
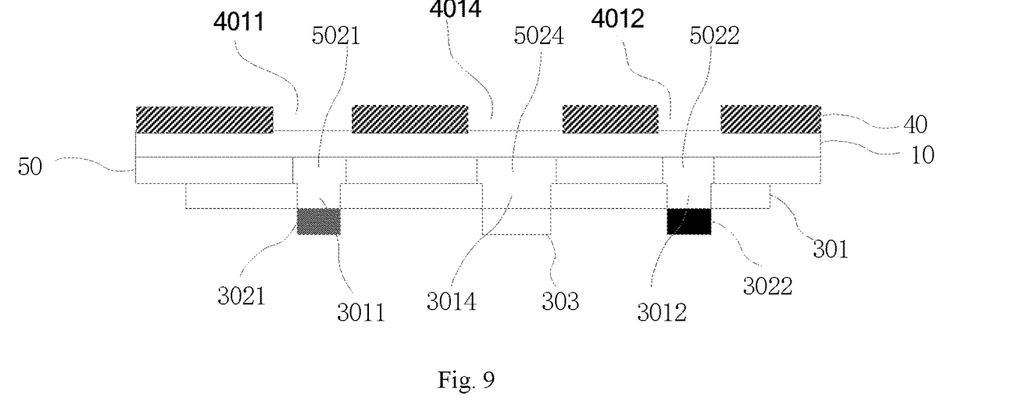
FIG. 9 is another cross-sectional view taken along the line BB' indicated in FIG. 5.
Figure 10:
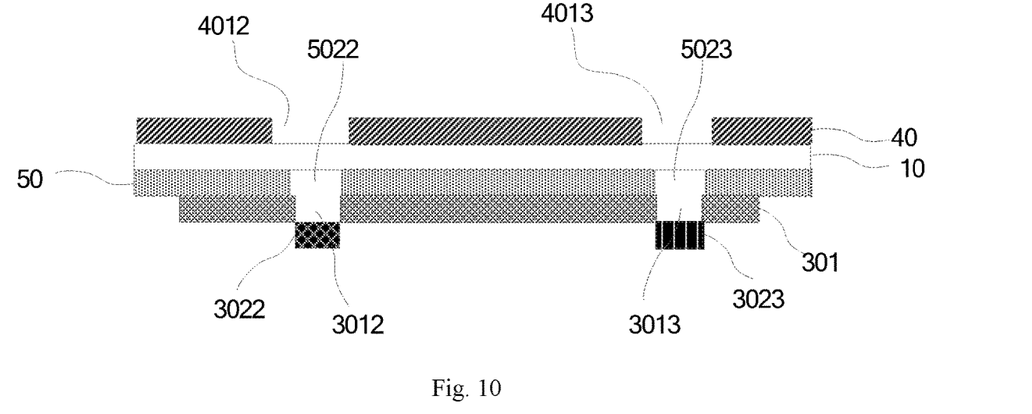
FIG. 10 is another cross-sectional view taken along the line CC' indicated in FIG. 5.

In some embodiments, as shown in FIGS. 9 and 10, the transflective film 40 has a plurality of third openings (4011, 4012, 4013, 4014), and an orthographic projection of a third opening covering an orthographic projection of an infrared LED or a photoelectric converter covers an orthographic projection of a first opening covering an orthographic projection of said infrared LED or said photoelectric converter on the transparent substrate. For example, for infrared LED 3021, an orthographic projection of the correspondingly arranged third opening 4011 on the transparent substrate 10 covers an orthographic projection of the correspondingly arranged first opening 5021 on the transparent substrate 10.

In some embodiments, as shown in FIGS. 9 and 10, the third opening 4011 is arranged corresponding to the infrared LED 3021, the third opening 4012 is arranged corresponding to the infrared LED 3022, and the third opening 4013 is arranged corresponding to the infrared LED 3023, and the third opening 4013 is arranged corresponding to the photoelectric converter 303. The area of the orthographic projection of a third opening on the transparent substrate is greater than or equal to the area of the orthographic projection of a first opening on the transparent substrate, which may avoid shielding of the infrared light by the transflective film, grantee effective transmission of the infrared light, and increase recognition accuracy of the infrared gesture recognition circuit.

It should be noted that, to prevent the arrangements of the third openings from affecting the normal mirror function, the third openings may be provided in an edge/corner area of the display device and designed as a decorative pattern to avoid affecting the mirror display effect while playing a decorative role. The third openings may also be configured as a hollow pattern, and the third openings include a plurality of sub-openings, and each sub-opening may be sized to be invisible to the naked eye, thereby ensuring the integrity of the mirror function.

In some embodiments, when the at least three infrared LEDs are in non-linear arrangement, the design cost is reduced while ensuring gesture recognition. FIG. 5 shows a schematic diagram of layout of three infrared LEDs including a first infrared LED 3021, a second infrared LED 3022 and a third infrared LED 3023, and a photoelectric converter 303. The three infrared LEDs may be respectively used as vertices of a right triangle enclosed thereby, and the photoelectric converter 303 is located at the center of a hypotenuse of the right triangle. Two right-angled sides of the enclosed right-angled triangle may be respectively parallel to borders of the transparent substrate 10, thereby achieving quick recognition of a gesture by the infrared gesture recognition circuit 30.

A spacing between the infrared LEDs is related to a recognition distance of the infrared gesture recognition circuit. For example, when the spacing between adjacent infrared LEDs is 25 cm, the infrared gesture recognition circuit may recognize operation gestures within the range of 0-30 cm. When the spacing between adjacent LEDs increases to 50 cm, the infrared gesture recognition circuit may recognize operation gestures within the range of 10 cm-50 cm. However, as the recognizable distance increases, it also requires an increase in the power of the infrared LEDs in order to meet the accuracy requirement of operation gesture recognition. The power of the LEDs in the latter example is about 3 to 4 times that of the LEDs in the former one.

In some embodiments, to recognize a gesture at a side of the transflective film 40 by the infrared gesture recognition circuit 30, the infrared gesture recognition circuit 30 further includes a first chip connected to the photoelectric converter 303. The first chip is configured to recognize the operation gesture according to an electrical signal output by the photoelectric converter 303. And the first chip may be any chip capable of implementing the above-mentioned functions.

In some embodiments, the first chip may be a master control chip. The master control chip is configured to recognize the operation gesture according to an electrical signal output by the photoelectric converter 303. In some embodiments, the master control chip may be integrated in the circuit board where the infrared gesture recognition circuit 30 is disposed.

Here, the master control chip is generally the core part of the motherboard or hard disk, which is the bridge between the various devices, and is also the center controlling operations of the device.

In some embodiments, to control the interface display of the display screen 20 through the operation gesture recognized by the infrared gesture recognition circuit 30, the display device further includes a second chip connected to the first chip. The second chip is configured to control the interface display of the display screen 20 according to the operation gesture.

In some embodiments, the second chip may be a System-on-a-chip, SOC.

In some embodiments, the SOC is connected to the first chip through a connector. The SOC is configured for receiving a data signal and a control signal for display, in addition to receiving the electrical signal sent by the first chip, thereby realizing control of the interface display of the display screen 20.

In an embodiment of the present disclosure, using a structure shown in FIGS. 5, 9 and 10 as an example, a process of recognizing a gesture at a side of the transflective film 40 by the infrared gesture recognition circuit 30 is described as follows.

The infrared light emitted by the at least three infrared LEDs (3021, 3022, 3023) successively passes through the second openings (3011, 3012, 3013) provided in the circuit board 301, the first openings (5021, 5022, 5023) provided in the shielding film 50, and the third openings (4011, 4012, 4013) provided in the transflective film 40, and is irradiated on the operator's hand, and the infrared light reflected back by the operator's hand passes through the third opening 4014, the first opening 5024 and the second opening 3014 successively, and is irradiated on the photoelectric converter 303. The photoelectric converter 303 converts the successively received optical signals from the infrared LEDs into an electrical signal, which is used to characterize a time sequence of peak values and the amplitudes of the optical signals from the infrared LEDs. Then, the first chip recognizes the operation gesture according to the electrical signal output by the photoelectric converter 303. The second chip controls the interface display of the display screen according to the operation gesture.

Using the location distribution of the first infrared LED 3021, the second infrared LED 3022, the third infrared LED 3023 and the photoelectric converter 303 shown in FIG. 5 as an example, if the photoelectric converter 303 first receives an optical signal from the second infrared LED 3022, and finally receives an optical signal from the third infrared LED 3023 and an optical signal from the first infrared LED 3021, then the current gesture operation is a swipe right operation. If the photoelectric converter 303 first receives an optical signal from the first infrared LED 3021 and an optical signal from the third infrared LED 3023, and finally receives an optical signal from the second infrared LED 3022, then the current gesture operation is a swipe left operation.

If the first chip determines that the operation gesture is stationary within a preset duration according to arrival time of peak values of the optical signals from the three infrared LEDs, the operation gesture is determined to be a "hover" operation. If the first chip determines that the gesture operation continuously changes from weak to strong at the same position within a preset duration according to the amplitudes of the optical signals from the three infrared LEDs, the operation gesture is determined to be a "press" operation. Otherwise, it is determined as a "lift" operation. Similarly, according to the arrival time sequence and amplitudes of the peak values of the optical signals, "upward", "downward", "clockwise", "counterclockwise", "click", "double-click" and other operation gestures may be recognized, which are not described here one by one as examples.

Figure 12:
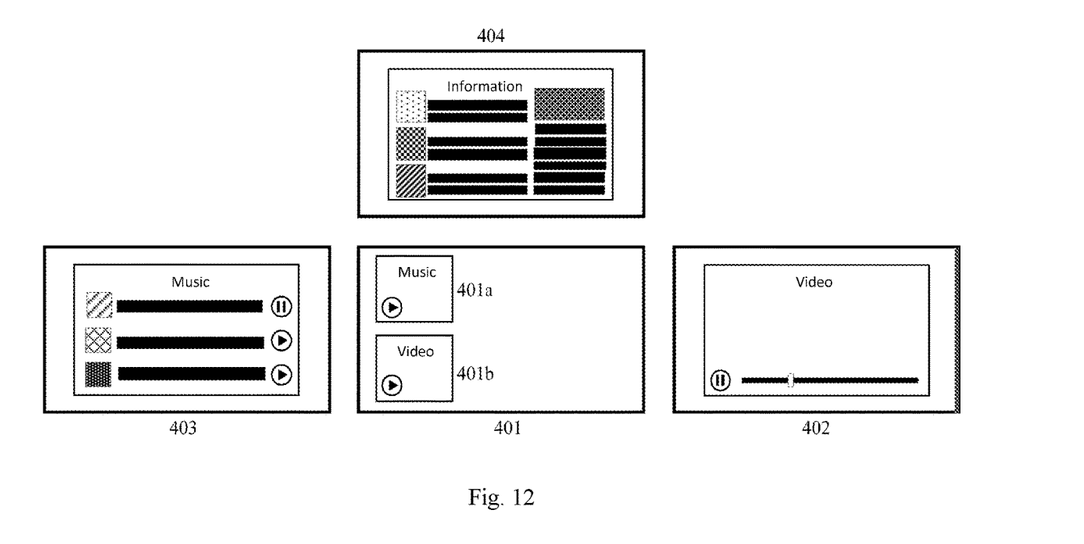
FIG. 12 is a schematic diagram illustrating four types of interface display of the display device provided in an embodiment of the present disclosure.

After the first chip determines the operation gesture, the second chip may control the interface display of the display screen 20 according to the operation gesture. For example, as shown in FIG. 12, an initial interface 401 of the display device after startup includes two small windows, namely a music small window 401a and a video small window 401b. A video interface 402 includes a large window for playing a video. A music interface 403 includes a large window for playing music and displaying a music list. An information interface 404 includes an information list interface for information such as weather conditions. Through a gesture operation, the user may control the display content of the display device to switch between the four display interfaces. For example, interactions of the four display interfaces may be controlled according to a schematic diagram of the gesture operations shown in FIG. 13.

Figure 13:
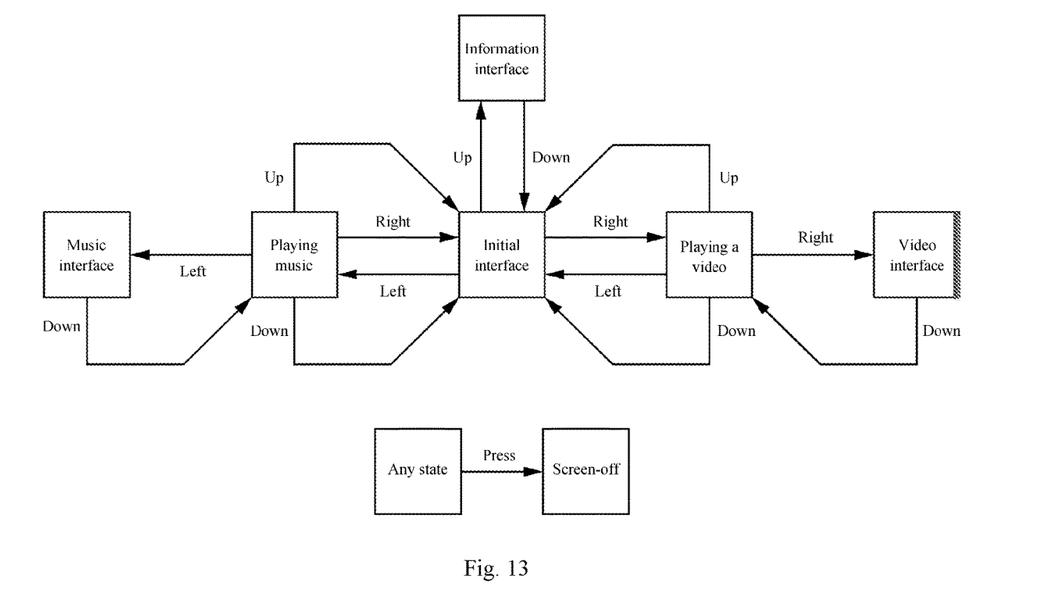
FIG. 13 is an interactive schematic diagram of controlling the four types of display interfaces in FIG. 10 provided in an embodiment of the present disclosure.

In some embodiments, if the display device displays the initial interface 401, and neither the music small window 401a nor the video small window 401b is in a playing state, when the user makes an "upward" gesture, the initial interface 401 may be switched to the information interface 404; when the user makes a "toward left" gesture, the music small window 401a starts playing music; and when the user makes a "toward right" gesture, the video small window 401b starts playing a video. If the display device displays the initial interface 401, and the small music window 401a is in the playing state, while the small video window 401b is not in the playing state, then making an "upward" or "downward" or "toward right" gesture causes the playing in the small music window 401a to pauses; and making a "toward left" gesture causes the interface to be switched to the music interface 403. On the initial interface 401, where the small music window 401a is not in the playing state, while the small video window 401b is in the playing state, making an "upward" or "downward" or "toward right" gesture causes the playing in the small video window 401b to pause; and making a "toward right" gesture causes the interface to be switched to the video interface 402.

If the current display interface of the display device is the music interface 403, and a "downward" gesture is made, then the interface is switched to the initial interface, where the music small window 401a continues to be in the playing state, and the video small window 401b is not in the playing state.

If the current display interface of the display device is the video interface 402, and a "downward" gesture is made, then the interface is switched to the initial interface, where the small music window 401a is not in the playing state, and the small video window 401b continues to be in the playing state.

If the current display interface of the display device is the information interface 404, and a "downward" gesture is made, then the interface is switched to the initial interface, where neither the music small window 401a nor the video small window 401b is in the playing state.

If a "press" gesture is made on any display interface (i.e. in any state) of the display device, the display screen 20 is turned off (i.e. screen off). For example, if a "press" operation is made on the music interface 403, the music stops playing. If the display screen 20 of the display device is currently in a screen-off state, and a "lift" gesture is made, the display screen 20 may be lit up, and the display interface of the display device returns to a display state before the screen is off, or returns to an initialized display state.

If a "counterclockwise rotation" gesture is made on the display device, the volume of the display device may be reduced, and if a "clockwise rotation" gesture is made on the display device, the volume may be increased.

Figure 14:
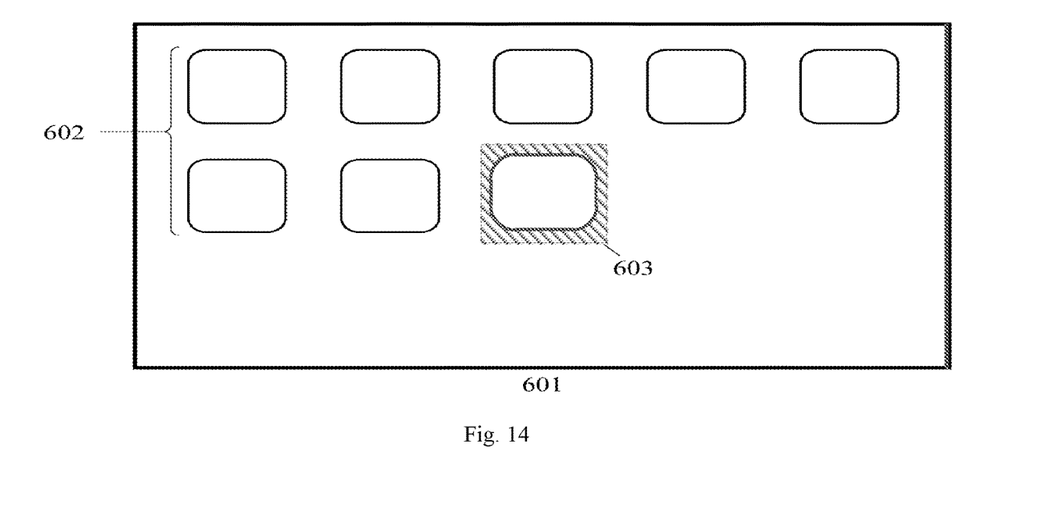
FIG. 14 is a schematic diagram of an interface of the display device during application selection provided in an embodiment of the present disclosure.

In addition, in an embodiment of the present disclosure, an air operation on an application program on the display device may also be achieved by infrared gesture recognition. FIG. 14 shows a schematic diagram of an application program selection interface 601 in a display device, in which application program icons 602 are arranged on the display interface of the display screen 20 in a preset order. When an application icon 603 in the application icons 602 is selected, the application icon 603 may be controlled to move in a corresponding direction by an "upward", "downward", "toward left", or "toward right" gesture operation. In addition, an application program corresponding to the selected application icon 603 may be enabled by a "click" gesture operation. Of course, those skilled in the art may set related operation gestures for the control of the display interface of the display device according to actual usage habits of the user, which will not be described in detail here.

Figure 15:
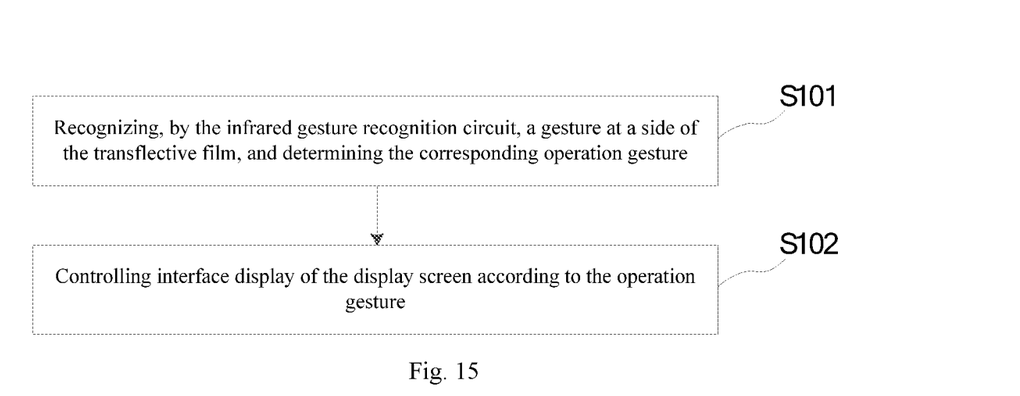
FIG. 15 is a schematic flow chart of a control method of a display device provided in an embodiment of the present disclosure.

Based on the same inventive concept, referring to FIG. 15, an embodiment of the present disclosure further provides a control method of the display device, including:

S101: recognizing, by the infrared gesture recognition circuit, a gesture at a side of the transflective film, and determining the corresponding operation gesture; and S102: controlling interface display of the display screen according to the operation gesture.

The implementation process of steps S101 to S102 has been described above in detail, and will not be repeated here.

Figure 16:
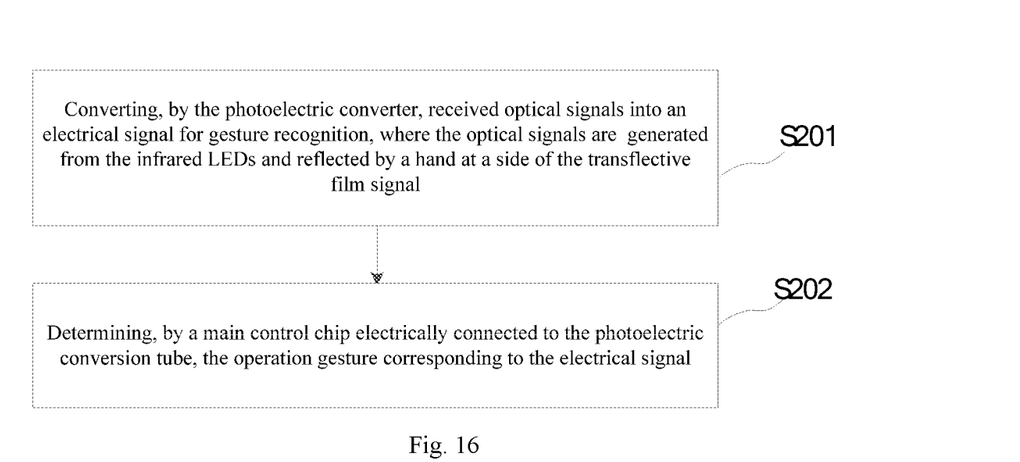
FIG. 16 is a schematic flow chart of step S101 in a control method of a display device provided in an embodiment of the present disclosure.

In an embodiment of the present disclosure, referring to FIG. 16, the implementation process of step S101 of recognizing, by the infrared gesture recognition circuit, a gesture at a side of the transflective film, and determining the corresponding operation gesture includes:

S201: converting, by the photoelectric converter, received optical signals into an electrical signal for gesture recognition, where the optical signals are generated from the infrared LEDs and reflected by a hand at a side of the transflective film signal; and S202: determining, by a first chip electrically connected to the photoelectric converter, the operation gesture corresponding to the electrical signal.

The implementation process of steps S201 to S202 has been described above in detail, and will not be repeated here.

Apparently, those skilled in the art may make changes and modifications to the present application without departing from the spirit and scope of the present application. Thus, the present application is also intended to encompass these changes and modifications if such changes and modifications of the present application are within the scope of the claims of the present application and equivalents thereof.

The invention claimed is:
1. A display device, comprising:
   a transparent substrate;
   a transflective film disposed on a first side of the transparent substrate;
   a display screen disposed on a second side of the transparent substrate, the first side being opposite to the second side;
   an infrared gesture recognition circuit disposed on the second side of the transparent substrate, wherein an orthographic projection of the infrared gesture recognition circuit on the transparent substrate and an orthographic projection of the display screen on the transparent substrate do not overlap each other, and the infrared gesture recognition circuit is configured to recognize a gesture at a side of the transflective film and control interface display of the display screen according to the determined operation gesture; and
   a shielding film disposed on the second side of the transparent substrate, wherein the shielding film has a first opening area and a second opening area, an orthographic projection of the first opening area on the transparent substrate covers an orthographic projection of an active display area of the display screen on the transparent substrate, and an orthographic projection of the second opening area on the transparent substrate covers an orthographic projection of an effective photosensitive area of the infrared gesture recognition circuit on the transparent substrate, wherein the infrared gesture recognition circuit comprises:
      a circuit board, at least three infrared light emitting diodes (LEDs), and a photoelectric converter,
      wherein the circuit board is disposed on a side of the shielding film facing away from the transparent substrate,
      the at least three infrared LEDs and the photoelectric converter are connected to the circuit board, and light emitting surfaces of the at least three infrared LEDs and a photosensitive surface of photoelectric converter face the transparent substrate, and
      the second opening area has a plurality of first openings, and an orthographic projection of each of the plurality of first openings on the transparent substrate covers an orthographic projection of each of the at least three infrared LEDs and the photoelectric converter on the transparent substrate.

2. The display device according to claim 1, wherein the transflective film has a plurality of third openings, and an orthographic projection of a third opening covering an orthographic projection of an infrared LED or a photoelectric converter covers an orthographic projection of a first opening covering an orthographic projection of said infrared LED or said photoelectric converter on the transparent substrate.

3. The display device according to claim 1, wherein the at least three infrared LEDs are in non-linear arrangement, and the photoelectric converter is disposed in an area enclosed by the at least three infrared LEDs.

4. The display device according to claim 1, wherein the infrared gesture recognition circuit comprises three infrared LEDs; an area enclosed by the three infrared LEDs forms a right triangle; and the three infrared LEDs are respectively located at vertices of the right triangle, and the photoelectric converter is located at a midpoint of a hypotenuse of the right triangle.

5. The display device according to claim 1, wherein the infrared gesture recognition circuit comprises four infrared LEDs; an area enclosed by the four infrared LEDs forms a rectangle; and wherein the four infrared LEDs are respectively located at vertices of the rectangle, and the photoelectric converter is located at a center of the rectangle.

6. The display device according to claim 1, wherein the infrared LEDs and the photoelectric converter operate within a central wavelength range of 850 nm-940 nm.

7. The display device according to claim 1, wherein the at least three infrared LEDs and the photoelectric converter are disposed on a side of the circuit board facing away from the transparent substrate; and
   the circuit board has a plurality of second openings, and an orthographic projection of each of the plurality of second openings on the transparent substrate covers an orthographic projection of each of the at least three infrared LEDs and the photoelectric converter on the transparent substrate.

8. The display device according to claim 7, an orthographic projection of a first opening covering an orthographic projection of an infrared LED or a photoelectric converter covers an orthographic projection of a second opening covering an orthographic projection of said infrared LED or said photoelectric converter on the transparent substrate.

9. The display device according to claim 1, wherein the infrared gesture recognition circuit further comprises a first chip;
   Wherein the first chip is connected to the photoelectric converter, and the first chip is configured to recognize the operation gesture according to an electrical signal output by the photoelectric converter.

10. The display device according to claim 9, further comprising a second chip;
    wherein the second chip is connected to the first chip, and the second chip is configured to control the interface display of the display screen according to the operation gesture.

11. The display device according to claim 1, wherein the at least three infrared LEDs and the photoelectric converter are disposed on a side of the circuit board facing the transparent substrate.

12. The display device according to claim 11, further comprising: a flat layer, wherein the flat layer is disposed on a side of the circuit board facing the transparent substrate;
    an orthographic projection of the flat layer on the transparent substrate and an orthographic projection of each of the at least three infrared LEDs and the photoelectric converter on the transparent substrate do not overlap each other.

13. The display device according to claim 12, a distance between the flat layer and the transparent substrate is equal to a distance between the infrared LEDs and the transparent substrate.

14. A control method of a display device,
    wherein the display device comprises:
       a transparent substrate;
       a transflective film disposed on a first side of the transparent substrate; a display screen disposed on a second side of the transparent substrate, the first side being opposite to the second side;
       an infrared gesture recognition circuit disposed on the second side of the transparent substrate wherein an orthographic projection of the infrared gesture recognition circuit on the transparent substrate and an orthographic projection of the display screen on the transparent substrate do not overlap each other, and the infrared gesture recognition circuit is configured to recognize a gesture at a side of the transflective film and control interface display of the display screen according to the determined operation gesture; and a shielding film disposed on the second side of the transparent substrate, wherein the shielding film has a first opening area and a second opening area, an orthographic projection of the first opening area on the transparent substrate covers an orthographic projection of an active display area of the display screen on the transparent substrate, and an orthographic projection of the second opening area on the transparent substrate covers an orthographic projection of an effective photosensitive area of the infrared gesture recognition circuit on the transparent substrate, wherein the infrared gesture recognition circuit comprises: a circuit board, at least three infrared light emitting diodes (LEDs) and a photoelectric converter, wherein the circuit board is disposed on a side of the shielding film facing away from the transparent substrate, the at least three infrared LEDs and the photoelectric converter are connected to the circuit board, and light emitting surfaces of the at least three infrared LEDs and a photosensitive surface of photoelectric converter face the transparent substrate, and the second opening area has a plurality of first openings, and an orthographic projection of each of the plurality of first openings on the transparent substrate covers an orthographic projection of each of the at least three infrared LEDs and the photoelectric converter on the transparent substrate; and wherein the control method comprises:

recognizing, by the infrared gesture recognition circuit, a gesture at a side of the transflective film, and determining the corresponding operation gesture; and controlling interface display of the display screen according to the operation gesture.

15. The method according to claim 14, wherein the infrared gesture recognition circuit comprises at least three infrared LEDs and a photoelectric converter; and recognizing, by the infrared gesture recognition circuit, a gesture at a side of the transflective film, and determining the corresponding operation gesture comprises:

converting, by the photoelectric converter, received optical signals into an electrical signal for gesture recognition, wherein the optical signals are generated from the infrared LEDs and reflected by a hand at a side of the transflective film signal; and determining, by a first chip electrically connected to the photoelectric converter, the operation gesture corresponding to the electrical signal.

* * * * *